United States Patent [19]

Lambert et al.

[11] Patent Number: 4,782,483

[45] Date of Patent: Nov. 1, 1988

[54] DATA TRANSMISSION SYSTEM AND METHOD OF PASSING ROLE OF PRIMARY STATION

[75] Inventors: Derek W. Lambert, Workingham; Stephen G. Scoltock, Bracknell, both of England

[73] Assignee: International Computers Limited, London, England

[21] Appl. No.: 68,649

[22] Filed: Jun. 30, 1987

[30] Foreign Application Priority Data

Nov. 14, 1986 [GB] United Kingdom ................. 8627238

[51] Int. Cl.4 ................................................. H04J 3/14
[52] U.S. Cl. ..................................... 370/90; 340/825.5
[58] Field of Search .................... 370/86.90; 340/825.5

[56] References Cited

U.S. PATENT DOCUMENTS

| 4,583,089 | 4/1986 | Cope | 340/825.5 |
| 4,596,012 | 6/1986 | Reed | 370/16 |
| 4,677,614 | 6/1987 | Circo | 370/86 |
| 4,713,807 | 12/1987 | Caves et al. | 370/89 |

Primary Examiner—Douglas W. Olms
Assistant Examiner—Min Jung
Attorney, Agent, or Firm—Lee & Smith

[57] ABSTRACT

A data transmission system is described, comprising a number of stations connected together in a ring. One of the stations acts as primary and can send a message at any time. The other stations act as secondaries and can transmit messages only when they receive a polling signal (EOP) from the primary. The primary keeps a record of the number of messages sent by each of the secondaries and, after it has itself received a predetermined number of messages, the primary attempts to pass on the role of primary to the secondary that has transmitted the greatest number of messages.

8 Claims, 3 Drawing Sheets

DATA TRANSMISSION SYSTEM AND METHOD OF PASSING ROLE OF PRIMARY STATION

BACKGROUND TO THE INVENTION

This invention relates to data transmission systems and is particularly, although not exclusively, concerned with systems of the kind generally referred to as local area networks.

One known form of data transmission system comprises a number of stations connected together in a ring or loop, so that data messages can be transmitted unidirectionally around the ring from one station to another. There are several ways of controlling such a ring. One known technique is to arrange for one of the stations to act as a primary station, and the others to act as secondaries. The primary can send messages on the ring at any time, whereas a secondary can send a message only if it receives a control signal, referred to as a polling signal or token, from the primary.

It has been proposed to allow the role of primary to be passed around the ring, so that each station in turn acts as the primary. One object of the present invention is to provide an improved way of passing the role of primary between stations, so as to improve the efficiency of the data transmission system.

SUMMARY OF THE INVENTION

According to the invention, there is provided a data transmission system comprising a plurality of stations connected together in a ring, wherein any one of the stations can act as a primary station, the others acting as secondary stations, wherein the secondary stations are allowed to transmit messages around the ring only when they receive a polling signal from the station currently acting as primary, and wherein the station acting as primary keeps a record of the number of messages sent by each of the secondary stations, selects the one of those stations that has transmitted the greatest number of messages, and passes the role of primary to that selected station.

BRIEF DESCRIPTION OF THE DRAWINGS

One embodiment of the invention will now be described by way of example with reference to the accompanying drawings.

DESCRIPTION OF AN EMBODIMENT OF THE INVENTION

Figure 1:
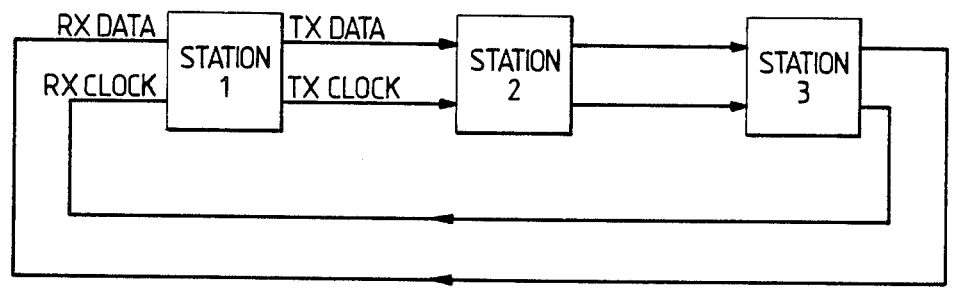
FIG. 1 is an overall block diagram of a data transmission system.

Referring to FIG. 1, this shows a data transmission system, or local area network, comprising up to 32 stations (station 1, station 2 . . . ) connected together in a ring.

Each station has a data output TXDATA and a clock output TXCLOCK which are respectively connected to a data input RXDATA and clock input RXCLOCK of the next station in the ring, so as to allow data and clock signals to be transmitted unidirectionally around the ring. Each of the connections between stations, although represented by a single line in FIG. 1, is actually a twisted pair of wires carrying balanced signals.

The stations communicate with each other by means of messages transmitted around the ring between the TXDATA and RXDATA terminals. Each message contains a destination address field, and a data field, as well as other information to be described in more detail later. The destination address may indicate a single station as the intended recipient of the message, or it may be a global address, indicating that the message is to be broadcast to all the stations.

At any given time, one of the stations assumes the role of primary, and the others act as secondaries. The primary station can transmit a message at any time. The message passes around the ring, through each secondary in turn, and is removed from the ring when it arrives back at the primary. Each secondary examines the address field of the message and, if it matches its own address, or if it is a global address, the secondary copies the message into an internal buffer.

When the primary is not transmitting a message, it transmits an idling signal consisting of a repeated sequence of flag bytes 01111110. At regular intervals (approximately 50 times a second) it inserts a mark pattern, consisting of a string of ones 11111111. Thus, the overall signal from the primary, when it has no message to send, is as follows:

| flag | flag | mark | flag |
|---|---|---|---|
| ---01111110 | 01111110 | 11111111 | 01111110--- |

It can be seen that the transition from the idling signal (flag) to the mark causes the binary sequence 01111111 (0 followed by seven ones) to appear on the ring. This sequence is referred to as the polling signal EOP, and is used to indicate to the secondary stations that they may transmit a message.

A secondary station is allowed to transmit a message on the ring only when it receives the EOP signal. If the secondary does not have any message to send, it simply allows the EOP signal to pass to the next station in the ring. If the secondary does have a message to send, it removes the EOP from the ring, by changing the last "1" of the EOP to a "0", thereby converting it into the flag pattern 01111110. The secondary then sends its message.

The message passes around the ring, through each station in turn, until it arrives at the primary, which removes the message from the ring, storing it in a buffer. The primary examines the address of the message to determine whether it has reached its intended destination. If it has, i.e. the destination was in the section of the ring from the originating station to the primary, then the message is discarded. If it has not yet reached its destination, i.e. the destination is in the other section of the ring, from the primary back to the originating station, then the primary puts the message into a forwarding queue, from where it will be transmitted back on to the ring.

It should be noted that since a secondary destroys the EOP signal when it transmits a message, only one message is sent for each EOP created by the primary. This means that each station need only have enough buffer space to hold a single message.

After receiving a predetermined number of messages, the primary station passes the role of primary on to another station, selected on the basis of the number of messages it has transmitted during the time that the current primary station has been in that role. More specifically, the primary first attempts to pass the role of primary to the secondary that has transmitted the greatest number of messages. If this station does not accept the role of primary, then an attempt is made to pass this role to the secondary that has transmitted the second greatest number of messages, and so on.

The messages are transmitted in the known SDLC (synchronous data link control) format. An SDLC message consists of the following fields:

| Field | Size (bytes) | Description |
| --- | --- | --- |
| Flag | 1 | opening flag (01111110) |
| destination | 1 | destination address |
| control | 1 | control byte |
| data | n | data bytes - possibly none |
| CRC | 2 | cyclic redundancy check |
| Flag | 1 | closing flag (01111110) |

When a message is transmitted, the transmitting station automatically inserts extra zeros into the main body of the message between the opening and closing flags, after every run of five consecutive ones. This ensures that the flag pattern 01111110 and the EOP pattern 01111111 are unique patterns, and cannot occur by chance in the main body of the message. These extra zeros are removed at the receiving station, which looks for runs of five consecutive ones, and deletes the next bit if it is a zero.

The destination address identifies the station to which the message is sent. The address value 255 (hexadecimal FF) is used as a global address, and indicates that the message is to be broadcast to all the stations.

If the first bit of the control byte is 1, the message is a data message. If on the other hand the first bit of the control byte is 0, the message is a control message, the meaning of which is indicated by the value of the rest of the control byte. Normally a control message contains no data field. In the case of a data message, the data field includes the address of the sending station, as well as data to be transmitted.

Only the following two control messages are relevant to the present invention:

| Control byte | description |
| --- | --- |
| 11110001 | request for new primary (RFNP) |
| 11110100 | New primary (NP) |

An RFNP control message is sent by the primary station when it wishes to pass on the role of primary to another station. This message is addressed to a specific one of the secondaries, selected as described above.

The NP message is broadcast by a station which is attempting to assume the role of primary. Normally, an NP message is sent following receipt of an RFNP message. The NP message informs the station which sent the RFNP message that the other station has accepted the role of primary, and so it can now become a secondary. The NP message travels all the way round the ring, and when it returns to the station that sent it, that station becomes the primary.

Alternatively, an NP message may be sent by a station if it suspects that there is no currenly active primary in the system. If there is a currently active primary, it will remove the NP message from the ring. If the NP message does not arrive back at the station that sent it, that station abandons its attempt to become primary, and reverts to the secondary role.

Figure 2:
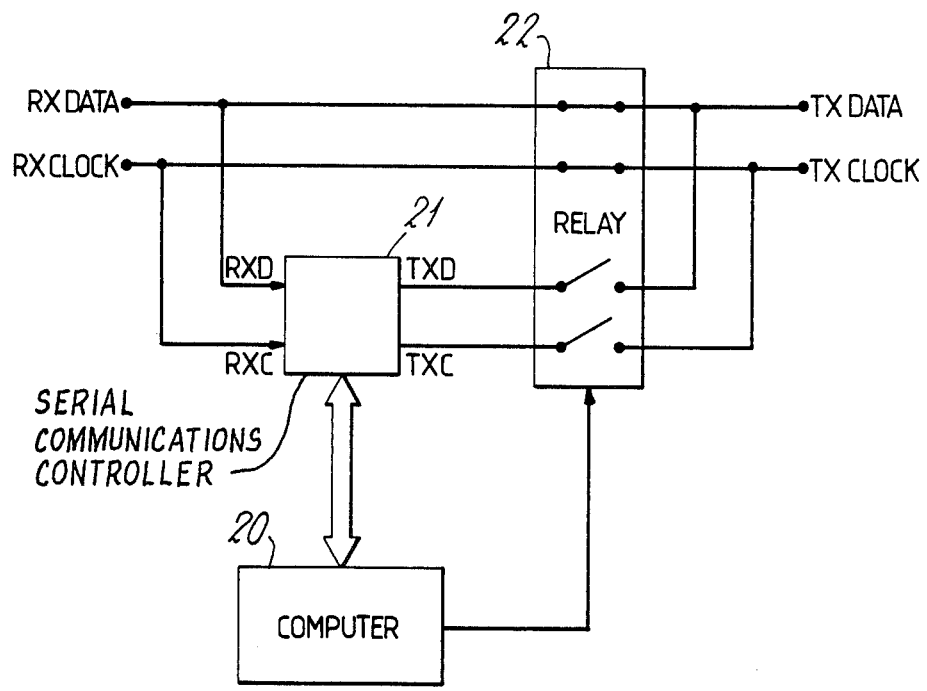
FIG. 2 shows one station of the system in more detail.

Referring now to FIG. 2, this shows one of the stations in more detail.

The station includes a computer 20 which may be for example an ICL Quattro personal computer. The computer is connected to the network by way of a serial communications controller SCC 21. The station also includes a relay 22.

When the station is powered down, the relay is closed, as indicated in the drawing. In this condition, the data input RXDATA and clock input RXCLOCK are connected directly to the data and clock outputs TXDATA and TXCLOCK, so as to by-pass the station. When the station is powered up, the relay is under the control of the computer. The relay is not opened until the SCC has been programmed by the computer, and is closed whenever the SCC is reset. When the relay is opened (i.e. when it is in the opposite state to that shown in the drawing) the serial data output TXD and clock output TXC of the SCC are connected to the outputs TXDATA and TXCLOCK of the station. The inputs RXDATA and RXCLOCK are connected permanently to inputs RXD and RXC of the SCC.

In this embodiment of the invention, the SCC comprises a Z8530 serial communications controller chip, supplied by Zilog Inc. For details of this chip, reference is made to the Z8530 Technical Manual, published by Zilog Inc, 1983.

The SCC has a number of modes of operation of which only two are utilised by the present invention: SDLC mode and SDLC loop mode. These modes are fully described in the above mentioned manual, and are described briefly below.

In the SDLC mode, the SCC can be instructed to transmit a message supplied to it by the computer. The SCC automatically adds the opening and closing flags and cyclic redundancy code CRC to the message, and inserts the extra zeros after groups of five consecutive ones, as required by the SDLC protocol. Alternatively, it can be programmed to send a continuous stream of flag signals, or a continuous stream of ones.

Also in this mode, the SCC can receive messages in the SDLC format described above. The SCC compares the destination address field of the message with a local address programmed into the SCC and, if the addresses match, or if the destination address is the global address, the message is copied into an internal first-in-first-out (FIFO) buffer. Alternatively, the address comparison can be disabled, in which case every message is copied into the FIFO buffer. Messages in the FIFO buffer are then transferred to the computer, using a direct memory access technique. The SCC automatically removes the extra zeros from the received message, and performs a check using the cyclic redundancy code CRC.

In the SDLC loop mode, the SCC can receive messages in the same way as in the SDLC mode. However, it can transmit a message only when it receives the polling signal EOP (01111111) from another station in the ring. The SCC automatically changes the last 1 of the EOP to 0 so as to convert it to the opening flag for the message.

In the SDLC loop mode, the SCC has two states, referred to as off loop and on loop. Either of these states can be selected by the computer, and the SCC indicates its state to the computer by means of an ON LOOP/-

OFF LOOP status signal. In the off loop state, the data input terminal RXO is connected directly to the data output terminal TXD with only gate delays in the path, so that the SCC is effectively by-passed. In the on loop state, a one bit-time delay is introduced into this path, allowing time for the last bit of an EOP to be changed as described above. The SCC can transmit messages in SDLC loop mode only when it is on-loop. In order to ensure an orderly transition between the on-loop and off-loop states, the SCC changes between these states at the first EOP signal received after the state is selected.

The SCC can also be programmed to select either a local clock source (not shown) or the remote clock received at its RXC input. The selected clock source is used for internal timing of the SCC, and is also output from the TXC terminal.

The computer in each station executes a number of different programs of which one, a message output program, is relevant to the present invention and will be described in detail below. This program has two modes: a primary mode and a secondary mode.

Figure 3:
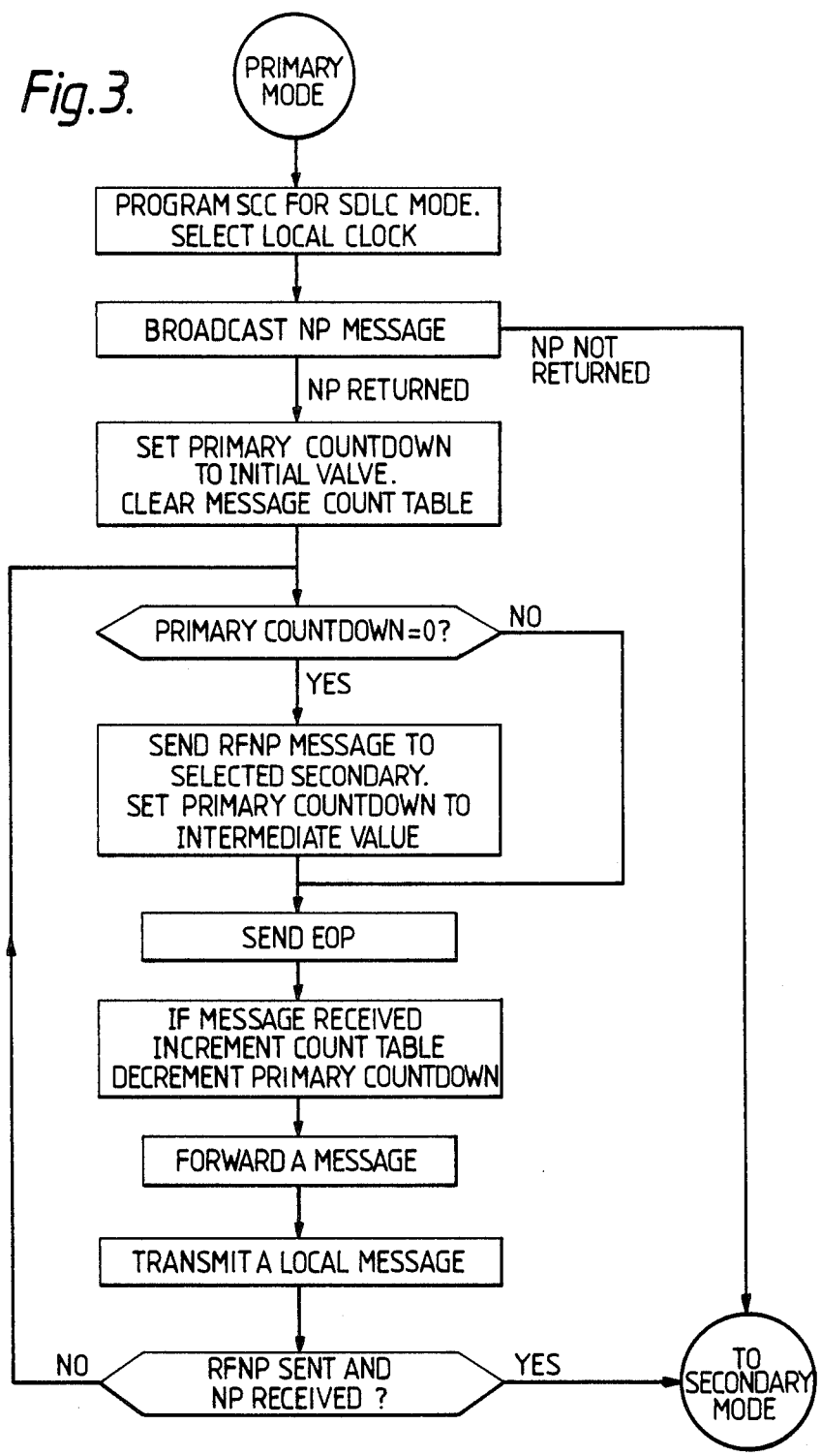
FIG. 3 is a flow chart illustrating operation of one of the stations in a primary mode.

Referring to FIG. 3, this shows the primary mode. The first action in the primary mode is to perform an initialisaton routine. This comprises programming the SCC so that it operates in the SDLC mode and selects its local clock source. The program then broadcasts a new primary (NP) message to all the other stations, and waits for it to return from the ring. If the NP message does not return, it is assumed that some other station must already be acting as primary, and hence the program reverts to its secondary mode. Otherwise, the program continues in primary mode. The final step of the initialisation procedure is to set a primary countdown to an initial value (typically 100), and to clear a message count table, which holds an entry for each of the other stations.

When the initialisation is complete, the message output program enters a loop as follows. The first action is to check whether the primary countdown has reached zero yet. If it has, the program prepares to enter the secondary mode, by sending a request for new primary (RFNP) message to the station which has the highest entry in the message count table. At the same time, it resets the primary countdown to an intermediate value, less than the initial value (typically 20).

The next step is to send an EOP signal, by briefly switching the SCC from sending continuous flag patterns to sending continuous ones, as described above. This allows one of the other stations to transmit a message on the ring. At this stage, the address recognition in the SCC is disabled, so that the primary can receive all messages from the ring, not just those addressed to it. Whenever a message is received from one of the other stations, the entry in the message count table for that station is incremented by one, and the primary countdown is decremented by one. If the message has not yet reached its destination, it is put in the forwarding queue.

The message output program now examines the forwarding queue and, if there are any messages in it, transmits one of them on to the ring. Similarly, if the primary station has any local messages to send, one of these is transmitted on the ring.

If an RFNP message has been sent, a check is now made to see whether a new primary (NP) message has been received in response, and if so, the program switches to secondary mode. Otherwise, the program repeats the above loop.

Figure 4:
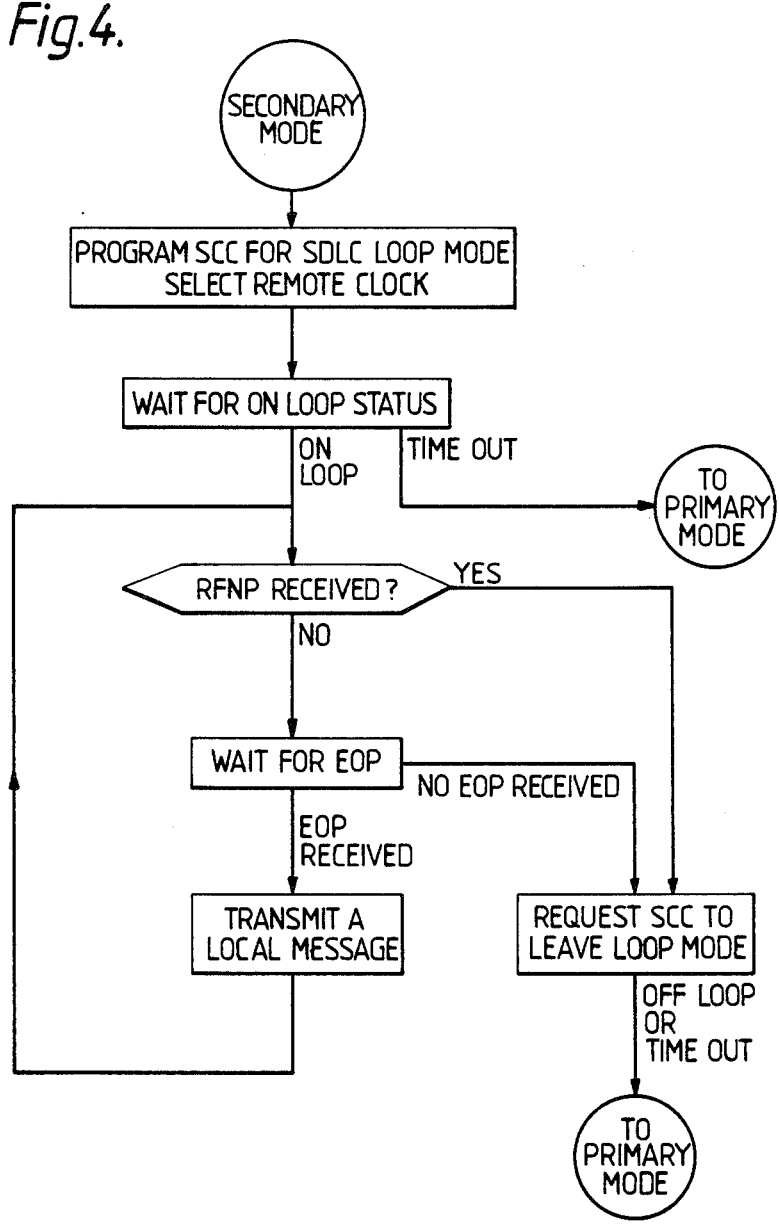
FIG. 4 is a flow chart illustration operation of one of the stations in a secondary mode.

Referring now to FIG. 4, this shows the secondary mode. The first action in this mode is to perform an initialisation routine. This comprises programming the SCC into its SDLC loop mode, and selecting the remote clock signal. The routine then waits until an ON LOOP status signal is received from the SCC. If no such signal is received within a predetermined timeout period, the program goes back to primary mode. Otherwise, the program remains in secondary mode.

When the initialisation is complete, the message output program enters a loop as follows. The first action is to check whether an RFNP message has been received. If not, then the program waits for the next EOP signal to be received, and then transmits a local message on the ring. The program then returns to the start of the loop.

If an RFNP message has been received, or if no EOP signal is received within a predetermined timeout period, the program enters the primary mode. First, it requests the SCC to go off-loop, and waits for an OFF LOOP status signal from the SCC. When OFF LOOP occurs, or if a predetermined timeout period elapses, the program returns to the start of the primary mode routine as shown in FIG. 3.

The advantages of passing on the role of primary to the station that has generated the most messages, rather than simply to the next station in the ring, include the following:

(a) It ensures that those stations which are active users of the network are more likely to be selected to act as primary, thereby resulting in a fairer distribution of the extra workload involved in acting as primary.

(b) It improves the performance of the network: it is better for a station that is actively using the network to be the primary, since this means that fewer messages have to be forwarded through the primary.

We claim:
1. A method of operating a data transmission system comprising a plurality of stations connected together in a ring, the method comprising the steps:
  (a) selecting one of the stations to act as a primary station and selecting the other stations to act as secondary stations,
  (b) operating the primary station to transmit messages and polling signals to the other stations via the ring,
  (c) operating each of said secondary stations, on receipt of one of said polling signals, to transmit a message around the ring, and
  (d) operating the primary station to keep a record of the number of messages transmitted by each of the secondary stations, to select the secondary station that has transmitted the greatest number of messages in a particular time period, and then to send a request signal to the selected secondary station inviting it to become the primary station.

2. A method according to claim 1 wherein the step of sending a request signal to the selected secondary station is performed after the primary station has received a predetermined number of messages over the ring.

3. A method according to claim 1 including the further steps of
  (a) operating a secondary station upon receipt of said request signal to send an acknowledgement signal back to the current primary station, and
  (b) operating the primary station to continue to act as primary station until it has received said acknowledgement signal.

4. A method according to claim 3 including the further step of operating the primary station, in the event that it does not receive said acknowledgement signal within a predetermined time after sending the request signal, to send a further request signal.

5. A data transmission system comprising a plurality of stations connected together in a ring, each station including:
   (a) means for operating the station in primary mode in which the station sends messages and polling signals over the ring to the other stations,
   (b) means for alternatively operating the station in a secondary mode in which the station responds to a polling signal received over the ring by sending a message over the ring, and
   (c) means operative when the station is in primary mode, for keeping a record of the number of messages sent by each of the other stations, for selecting the one of the other stations that has sent the greatest number of messages in a particular time period, and for then sending a request signal to the selected station inviting it to become the primary station.

6. A system according to claim 5 wherein each station further includes means operative when the station is in the primary mode for setting a countdown, to a first value when the station enters the primary mode, means for decrementing countdown whenever the station receives a message, and means for sending said request signal when the countdown expires.

7. A system according to claim 5 wherein each station further includes means operative when the station is in the secondary mode, upon receipt of said request signal, for sending an acknowledgement signal over the ring and then entering the primary mode.

8. A system according to claim 7 wherein each station further includes means operative when the station is in the primary mode, upon receipt of said acknowledgement signal, for entering the secondary mode.

* * * * *